United States Patent [19]

Land et al.

[11] 4,306,324

[45] Dec. 22, 1981

[54] MACHINE FOR SLOTTING THE HEADS OF BOLTS HAVING HEXAGONAL HEADS

[76] Inventors: Walter Land, Edmund-Strutz-Weg 9a, 5600 Wuppertal 21; Friedhelm Gierth, Am Lohsiepen 174; Horst von Kürten, Mastweg 5,, both of 5600 Wuppertal 12, all of Fed. Rep. of Germany

[21] Appl. No.: 103,606

[22] Filed: Dec. 14, 1979

[30] Foreign Application Priority Data

Dec. 15, 1978 [DE] Fed. Rep. of Germany ....... 2854253

[51] Int. Cl.³ .............................................. B23G 9/00
[52] U.S. Cl. ............................................. 10/6; 10/19
[58] Field of Search .................... 10/3, 5, 6, 7, 19, 26, 10/169, 162 R, DIG. 5

[56] References Cited

U.S. PATENT DOCUMENTS

| | | | |
|---|---|---|---|
| 2,741,784 | 4/1956 | Fray ......................................... | 10/6 |
| 2,829,387 | 4/1958 | Carangelo ................................. | 10/6 |
| 3,111,697 | 11/1963 | Wilson ..................................... | 10/6 |
| 3,422,472 | 1/1969 | Pomernacki ........................... | 10/6 X |
| 3,585,665 | 6/1971 | Jackson ................................... | 10/6 |

*Primary Examiner*—Mark Rosenbaum
*Attorney, Agent, or Firm*—Becker & Becker, Inc.

[57] ABSTRACT

A machine for slotting hexagonal heads of bolts at right angles to oppositely located edges of the heads. The machine includes a rotatable driven conveying wheel having radially arranged grooves for receiving the shafts of bolts therewith; an alignment device, for aligning the edges of the bolt heads in a predetermined position relative to the conveying plane; a clamping device, for clamping the shafts of the bolts relative to the grooves of the conveying wheel over a predetermined conveying or clamping region of the bolts; a cutting device arranged relative to the clamping region of the bolts for cutting a slot into the heads of the bolts during transport thereof through the clamping region; and a device for removing burrs resulting on the bolt heads during cutting of the slots. The alignment device includes a guide surface movable transverse to the plane of conveying by a predetermined extent into the region of movement of the heads of the bolts, and, as seen in the conveying direction, is located a predetermined amount before the beginning of the clamping region, which follows in the conveying direction. A friction member is provided ahead of the burr removal device and extends over a predetermined length in the direction of conveying for the purpose of rotation of the bolt by 90°. The guide surface is formed by a body which is adjustable in the conveying direction of the bolt at the end of an arm of a two-arm lever, one end of which is pivotally journalled about a bolt, and the other end of which is provided with an adjustable abutment and is engaged effectively by a biasing spring.

4 Claims, 4 Drawing Figures

FIG.2

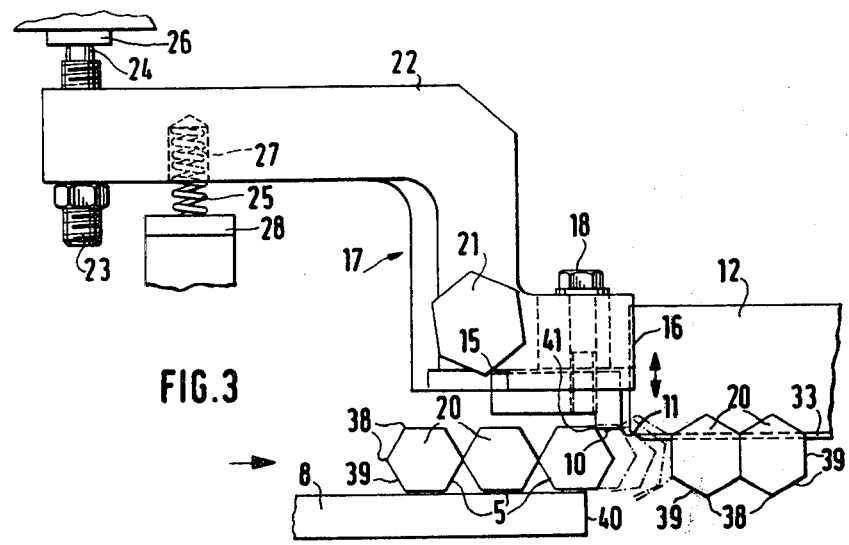
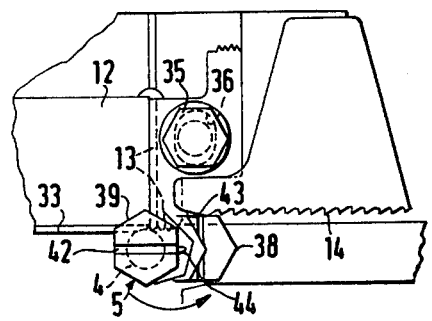

MACHINE FOR SLOTTING THE HEADS OF BOLTS HAVING HEXAGONAL HEADS

The present invention relates to a machine for slotting the heads of bolts having hexagonal heads. The machine has a rotatable driven conveying wheel having radially arranged grooves for receiving the shafts of pertaining bolts, alignment means, for aligning the edges of the bolt heads in a predetermined position relative to the conveying plane, the alignment means being journalled on the machine laterally of the region of movement of the bolt heads transverse to their conveying plane, being yielding in a spring-like manner, and possibly being located on both sides of the bolt heads; clamping means, for clamping the shafts of the bolts relative to the grooves of the conveying wheel over a predetermined conveying section or stretch (clamping region) of the bolts, the clamping means following the alignment means in the conveying direction and lying opposite the grooves of the conveying wheel; cutting means arranged relative to the clamping region of the bolts for cutting a slot, which extends in the conveying direction, into the heads of the bolts during transport thereof through the clamping region; and means for removing burrs resulting on the bolt heads during cutting of the slots.

BACKGROUND OF THE INVENTION

For slotting the heads of bolts or studs having hexagonal heads, there are various machines known, including for instance the machine according to U.S. Pat. No. 3,585,665.

Known machines such as that of U.S. Pat. No. 3,585,665 make possible a slotting of the hexagonal heads of such bolts only diametrically, or in a direction corresponding to that of a line interconnecting oppositely located corners of the hexagonal heads. Such known machines do not make possible, as is often required, a slotting which is naturally centered and at right angles to opposite edges of hexagonal heads.

OBJECT OF THE INVENTION

It is therefore an object of the present invention to provide a machine which makes possible a slotting of hexagonal heads of bolts or studs, particularly at a location at right angles to opposite edges of the hexagonal heads, accompanied by high piece capacity or output of the machine. Suitably, in connection with the slotting, it should also be possible to remove burrs, ridges, or flashes.

This object, and other objects and advantages of the present invention, will appear more clearly from the following specification in connection with the accompanying drawings, in which:

FIG. 2 is a plan view of the conveyor wheel according to FIG. 1;

Figure 1:
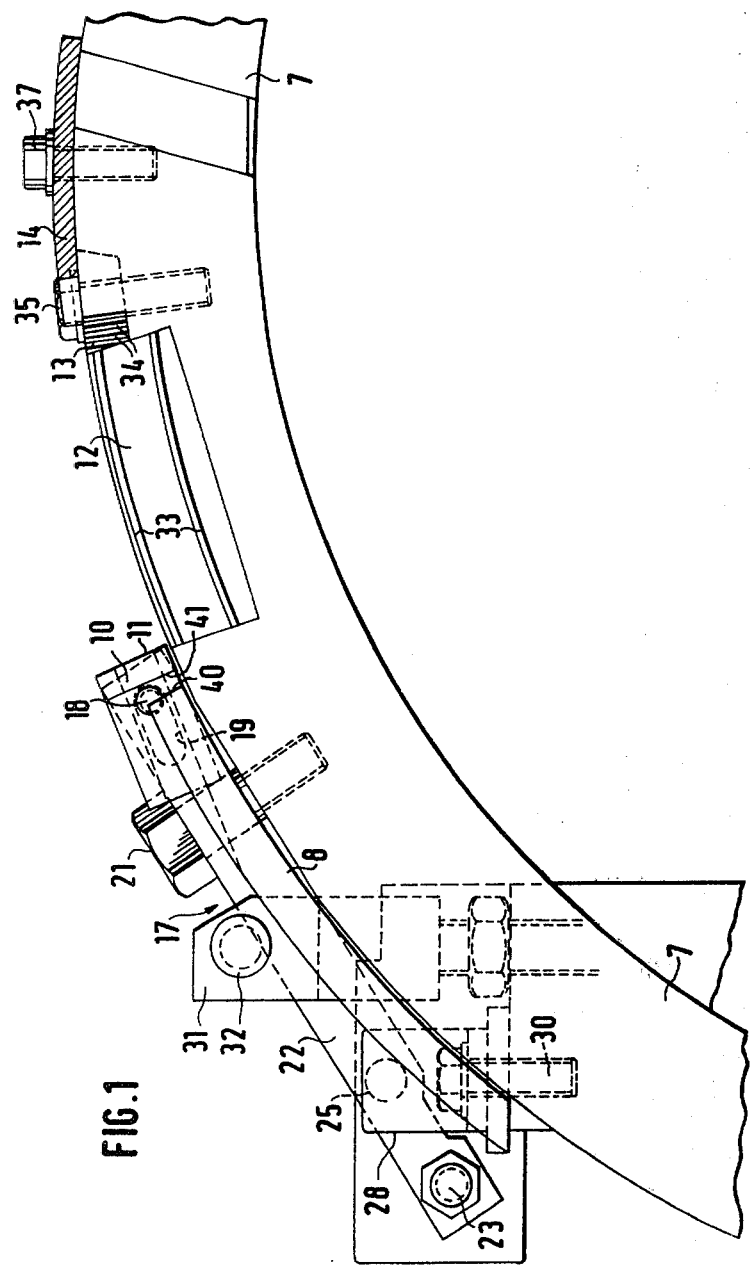
FIG. 1 is a front view of a segment representing an essential region of a conveyor wheel for bolts of a machine in accordance with the teaching of the present invention.
Figure 2:
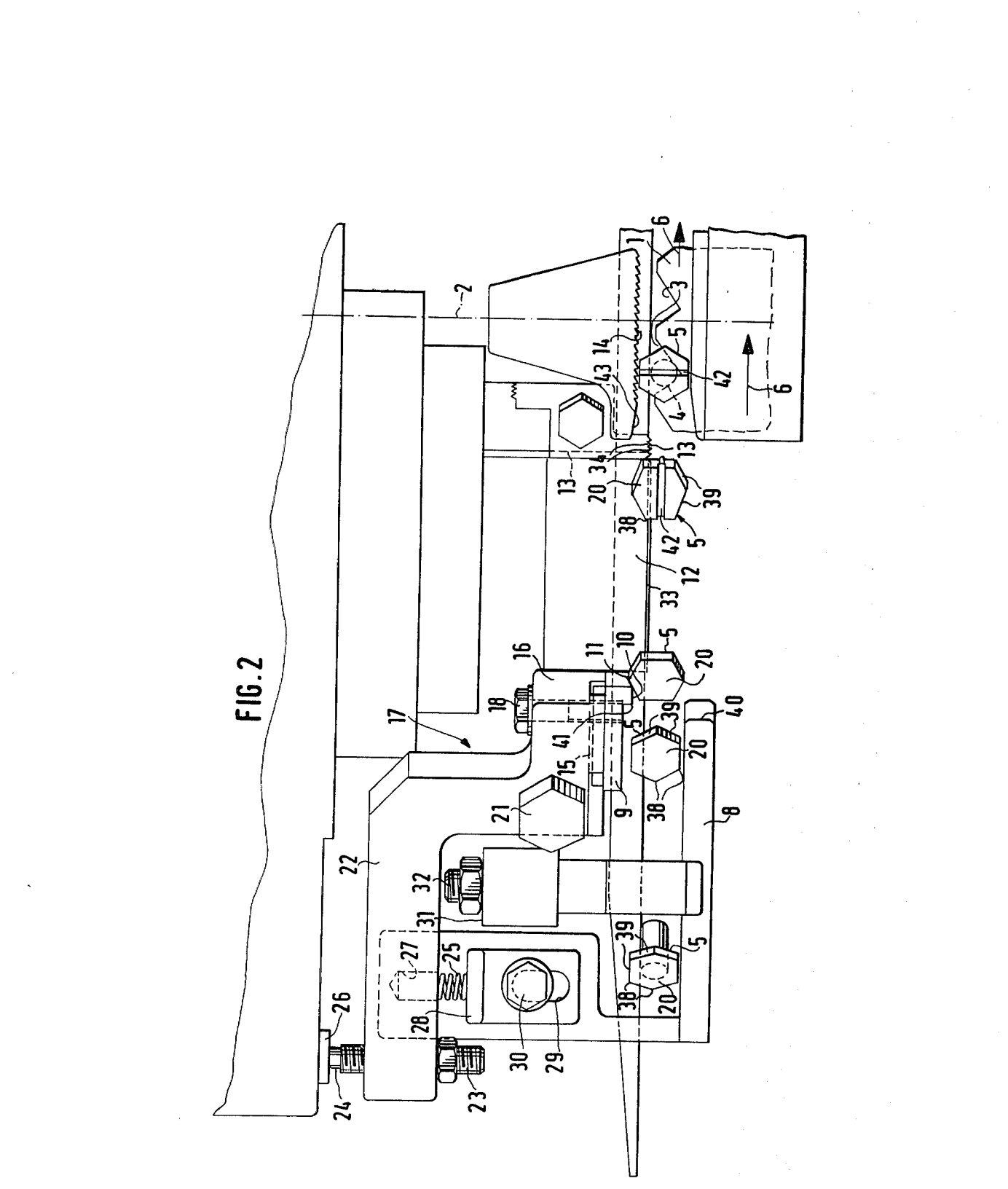

FIG. 3 is a plan view of a smaller segment of the conveyor wheel according to FIG. 1, though taken at a viewing angle changed somewhat from the illustration in FIG. 2 and illustrating details for setting forth the operation of the inventive machine with respect to the slotting of hexagonal heads; and FIG. 4 is a segment from the illustration in FIG. 2, with details being shown to set forth the operation of the inventive machine with respect to the removal of burrs, flash or ridges to be accomplished after the slotting operation.

SUMMARY OF THE INVENTION

The machine of the present invention is characterized primarily in that:

for the purpose of aligning or orienting the heads of the bolts in a position in which oppositely located edges of the heads of the bolts extend at right angles to the conveying direction, the alignment or orientation means essentially comprises a guide surface provided on only one side of the heads of the bolts, with the length of the guide surface not exceeding the free spacing between heads of adjacent bolts as seen in conveying direction, the guide surface ending in a terminal edge extending approximately radial to the turning axis of the conveying wheel. The terminal edge is movable transverse to the conveying plane by a predetermined amount into the region of movement of the heads of the bolts, and, as seen in the conveying direction, is located a predetermined amount before the beginning of the clamping region, which follows in the conveying direction; and in the conveying direction, ahead of the means provided for removal of burrs, flash or ridges located on the heads of the bolts, there are provided friction means subsequent to the clamping region extending into the region of movement of the shafts of the bolts, with such friction means extending over a distance of predetermined length in the conveying direction for the purpose of turning the bolt by 90°.

DETAILED DESCRIPTION OF THE INVENTION

The drawings indicate or show a representation of only a portion of a conveyor wheel of a machine for slotting the heads of bolts; the conveyor wheel 1 has grooves 3 extending radially of the turning axis 2, with the grooves 3 being provided each to receive a shaft 4 of a bolt 5. In the turning or rotational direction of the conveyor wheel 1, represented by the arrow 6, upon or on a segment 7 located across from the grooves 3 there lie arranged serially with respect to each other a guide rail 8, a body 9 with a guide surface 10 and terminating edges 11, a clamping body 12, a friction body 13, and a burr, flash or ridge removing member 14.

The body 9 with the guide surface 10 and the terminating edge 11 is adjustable in a guide 15 of an arm 16 of a two-arm lever 17 approximately in conveying direction of the bolts 5 (arrow 6) with respect to the lever 17, and the body is capable of being clamped or secured on the lever 17 by means of a screw bolt 18 and a slot 19 as well as a screw nut and the like. There is recognizable that the length of the guide surface 10 does not exceed the free space between neighboring heads 20 of bolts 5 as seen in conveying direction.

The lever 17 is pivotally journalled upon a bolt 21 and extends into an arm 22 on the other side. In the arm 22 there is adjustably journalled an abutment pin 23 of which an end 24, under the influence of a spring 25, abuts or engages against a fixed abutment 26. The spring 25 is guided on the one hand in a bore 27 in the arm 22 of the lever 17, and on the other hand is supported or is in engagement with a support 28. The support 28 is adjustable in the axial direction of the spring 25 by way of a slot 29 and a screw bolt 30.

The guide rail 8 is adjustable transverse to the conveying plane of the bolts 5 with respect to a fixed support 31 by means of screw bolts 32.

The clamping body, which follows the guide surface 10 in the conveying direction, has clamping ribs 33 which extend by a predetermined measurement in the region of movement of the shafts 4 of the bolts 5.

The friction body 13 then following in the conveying direction has a tooth means 34 which likewise extends by a predetermined measurement into the region of movement of the shafts 4. The friction body 13 is adjustably secured on the segments 7 or on the machine frame, with such adjustment occurring by means of the bolt 35 and slot 36 transverse to the conveying plane. The burr, flash, or ridge removing means 14 finally following the friction body 13 is fastened on the segment 7 by means of bolts 37.

The operation of the described machine is as follows:

In the course of conveying bolts 5 in the direction of the arrow 6 by the conveying wheel 1, the hexagonal heads 20 of the bolts are first so aligned or oriented by means of the guide rail 8 that the connection line of two corners 38 extends parallel to the conveying direction. After passing the end 40 of the guide rail 8, one of two edges 39 of a head 20 adjoining each other and respectively located in front in the conveying direction comes into the region of an edge 41 of the guide surface 10. This edge 41 extends into the region of movement of the head 20 of the particular bolt 5. Further in the course of the conveying of this bolt, a predetermined torque is exerted by the edge 41 upon the bolt, so that the bolt rotates counterclockwise by 60°, and correspondingly slides along with that edge 39 against the guide surface 10 which prior to the beginning of the rotation or turning movement of the bolt hit upon the edge 41 of the guide surface 10.

While the particular edge 39 of the bolt slides along against the guide surface 10, a predetermined force caused by the spring 25 is exerted thereby upon the pertaining edge 39 of the head 20 of the bolt. As soon as the axis of the bolt as seen in the conveying direction is located approximately upon the same height or level with the terminating edge 11 of the guide surface 10, there begins a continuously increasing torque effective under the influence of the spring 25 upon the bolt or the head 20 thereof, with the consequence that the bolt is turned further counterclockwise while the bolt leaves the region of the guide surface 10. The movement of the guide surface 10 or the terminating edge 11 into the region of movement of the heads 20 of the bolts (such movement first making possible the last described rotation or turning of the bolt) is limited by the abutment 26. This limitation of movement is so adjusted that the pertaining bolt, after leaving the region of the guide surface 10, with the terminating edge 11, is rotated exactly by 30° below the position occupied by the guide surface 10. This is illustrated especially by the view of FIG. 3. As soon as the bolt has carried out this rotation of 30°, and accordingly has come out of contact with the terminating edge 11, the shaft 4 of the pertaining bolt comes into contact with the clamping ribs 33 of the clamping body 12. Hereby the bolt is held in the desired position or alignment or orientation during the then subsequent occurrence of sawing or cutting of a slot 42 in the head 20, with the bolt being held particularly in such a manner that the slot 42 is arranged at right angles to edges 39 located across from each other in the head 20.

The described structural elements, insofar as they are adjustable and/or exchangeable, are naturally adapted to be matched to or adapted to bolts with hexagonal heads of different sizes. With respect to the "dip depth" of the guide surface 10 in the region of movement of the heads 20 of the bolts 5, it is to be noted that this depth is in initial approximation approximately 0.08 d, whereby d is the spacing of oppositely located corners or edges 38 of a head 20. Finally, an optimum adjustment of the inventive machine however must be brought about by tests.

With the aid of the friction body 13 for the case of a desired burr, flash or ridge removal, there can be effected according to a so-called "downcut milling" (climb or down cut milling) a counterclockwise rotation or turning of approximately 30°. After this turning or rotation, the particular neighboring edge 39 of a head 20 is grasped by the inlet incline 43 of the burr, flash or ridge remover 14, whereupon the head 20 is then further aligned or oriented and the burring, flash or ridges 44, located approximately at one end of the slot 42, can be removed (see FIG. 4).

ADVANTAGES OF THE INVENTION

With the inventive machine, slots can be cut or sawed to hexagonal heads or bolts, with such slots extending at right angles to oppositely located edges of the hexagonal heads, during continuous operation of a conveying wheel for the bolts, during continuous operation of a saw for sawing or cutting the slots, and at a correspondingly higher possible piece output or capacity.

The present invention is, of course, in no way restricted to the specific disclosure of the specification and drawings, but also encompasses any modifications within the scope of the appended claims.

What we claim is:

1. A machine for slotting the heads of bolts having hexagonal heads with at least one side and with a region of movement, said machine comprising:

a rotatable driven conveying wheel having a turning axis and having radially arranged grooves for receiving the shafts of bolts therewith moved in a conveying direction along a conveying plane;

alignment means, for aligning the edges of the bolt heads in a position having a free space therebetween and having oppositely located edges of the heads of the bolts extending at right angles to the direction of conveying thereof, said alignment means being journalled on at least one side of the heads of said bolts laterally of the region of movement of said bolt heads transverse to their conveying plane, being yielding in a spring-like manner, and comprising a guide surface being at least equal to the free space between heads of adjacent bolts in the conveying direction thereof, said guide surface ending in a terminal edge located approximately radially of the turning axis of said conveying wheel;

clamping means, for clamping the shafts of said bolts relative to said grooves of said conveying wheel over a clamping region of said bolts, said clamping region having a beginning and said clamping means following said alignment means in the conveying direction and being located opposite said grooves of said conveying wheel, said terminal edge of said guide surface being movable transverse to the conveying plane by a predetermined distance into the region of movement of the heads of said bolts, and, as seen in the conveying direction, being located a predetermined distance ahead of the beginning of said clamping region, which follows in the conveying direction:

cutting means arranged relative to said clamping region of said bolts for cutting a slot, which extends in the conveying direction, in the heads of said bolts during transport thereof through said clamping region;

means for removing burrs resulting on the heads of said bolts during cutting of said slots; and friction means located in the conveying direction ahead of said means for removing burrs and subsequent to said clamping region, said friction means extending into the region of movement of said bolt shafts over a predetermined distance in the conveying direction for turning said bolts by 90°.

2. A machine according to claim 1, in which a guide rail, as seen in the direction of conveying, is located ahead of the start of said guide surface on that side of the conveying path of said bolt opposite said guide surface.

3. A machine according to claim 1, in which said guide surface and said clamping means are arranged on the same side of the conveying path of said bolts.

4. A machine according to claim 1, which includes a two-arm lever, one end of which is journalled about a bolt, and the other end of which is provided with an adjustable abutment and is subjected to the action of a spring, said guide surface comprising a body which is adjustable in the conveying direction of said bolts at one end of one arm of said two-arm lever.

* * * * *

UNITED STATES PATENT AND TRADEMARK OFFICE
CERTIFICATE OF CORRECTION

PATENT NO. : 4,306,324
DATED : 22 December 1981
INVENTOR(S) : Walter Land et al

It is certified that error appears in the above—identified patent and that said Letters Patent is hereby corrected as shown below:

On the title page, please insert the following:

(73) Assignee: Gebr. Hilgeland
Federal Republic of Germany

Signed and Sealed this

Eleventh Day of May 1982

[SEAL]

Attest:

GERALD J. MOSSINGHOFF

Attesting Officer     Commissioner of Patents and Trademarks